United States Patent
Gavrilov et al.

(10) Patent No.: US 11,023,250 B2
(45) Date of Patent: Jun. 1, 2021

(54) RESETTING A PERIPHERAL DEVICE

(71) Applicant: International Business Machines Corporation, Armonk, NY (US)

(72) Inventors: Constantine Gavrilov, Rishon le-Zion (IL); Leonid Chernin, Tel-Aviv (IL)

(73) Assignee: International Business Machines Corporation, Armonk, NY (US)

( * ) Notice: Subject to any disclaimer, the term of this patent is extended or adjusted under 35 U.S.C. 154(b) by 147 days.

Patent file contains an affidavit/declaration under 37 CFR 1.130(b).

(21) Appl. No.: 16/359,762

(22) Filed: Mar. 20, 2019

(65) Prior Publication Data

US 2020/0301718 A1    Sep. 24, 2020

(51) Int. Cl.
*G06F 9/4401* (2018.01)
*G06F 13/24* (2006.01)
*G06F 13/28* (2006.01)
*G06F 13/10* (2006.01)

(52) U.S. Cl.
CPC .......... *G06F 9/4403* (2013.01); *G06F 13/102* (2013.01); *G06F 13/24* (2013.01); *G06F 13/28* (2013.01)

(58) Field of Classification Search
CPC ........ G06F 9/4403; G06F 13/24; G06F 13/28; G06F 13/102
See application file for complete search history.

(56) References Cited

U.S. PATENT DOCUMENTS

| | | | |
|---|---|---|---|
| 9,092,297 B2 | 7/2015 | Armstrong et al. | |
| 9,563,581 B1 * | 2/2017 | Kumar | G06F 13/4068 |
| 2017/0054593 A1 | 2/2017 | Borikar et al. | |
| 2017/0090948 A1 | 3/2017 | Waidhofer et al. | |
| 2018/0101376 A1 | 4/2018 | Olarig et al. | |
| 2018/0314657 A1 | 11/2018 | Chen et al. | |
| 2018/0316760 A1 * | 11/2018 | Chernin | G06F 3/067 |

* cited by examiner

*Primary Examiner* — Brian T Misiura
(74) *Attorney, Agent, or Firm* — Kunzler Bean & Adamson

(57) ABSTRACT

Apparatuses, methods, systems, and program products are disclosed for resetting a peripheral device. An apparatus includes a disconnect module that detaches each of one or more device contexts from a peripheral device in response to a reset request for the peripheral device. Each of the one or more device contexts describes a connection between the peripheral device and a process. An apparatus includes an access module that prevents the one or more device contexts for one or more processes from accessing the peripheral device. An apparatus includes a reset module that resets the peripheral device in response to the one or more device contexts being detached from the peripheral device.

20 Claims, 5 Drawing Sheets

RESETTING A PERIPHERAL DEVICE

BACKGROUND

The subject matter disclosed herein relates to peripheral devices and more particularly relates to quick reset and restart of memory mapped peripheral devices.

SUMMARY

An apparatus for resetting a peripheral device is disclosed. A computer-implemented method and computer program product also perform the functions of the apparatus. According to one embodiment, an apparatus includes a disconnect module that detaches each of one or more device contexts from a peripheral device in response to a reset request for the peripheral device. Each of the one or more device contexts may describe a connection between the peripheral device and a process. An apparatus, in certain embodiments, includes an access module that prevents the one or more device contexts for one or more processes from accessing the peripheral device. An apparatus, in one embodiment, includes a reset module that resets the peripheral device in response to the one or more device contexts being detached from the peripheral device.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION OF THE INVENTION

Figure 1:
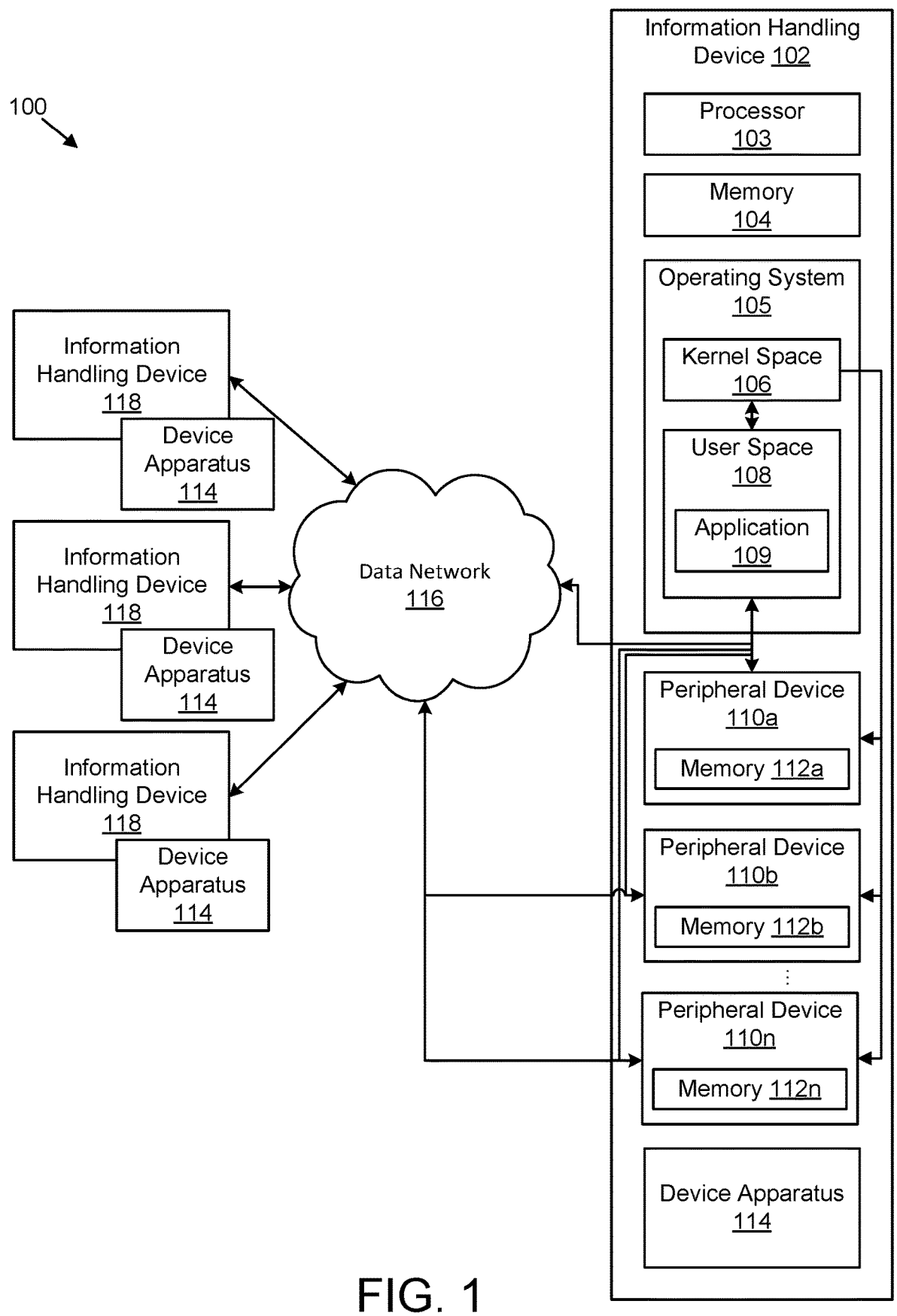
FIG. 1 is a schematic block diagram illustrating one embodiment of a system for resetting a peripheral device.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object-oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together but may comprise disparate instructions stored in different locations which, when joined logically together, comprise the module and achieve the stated purpose for the module.

The description of elements in each figure may refer to elements of proceeding figures. Like numbers refer to like elements in all figures, including alternate embodiments of like elements.

In one embodiment, an apparatus includes a disconnect module that detaches each of one or more device contexts from a peripheral device in response to a reset request for the peripheral device. Each of the one or more device contexts may describe a connection between the peripheral device and a process. In further embodiments, an apparatus includes an access module that prevents the one or more device contexts for one or more processes from accessing the peripheral device. In various embodiments, an apparatus includes a reset module that resets the peripheral device in response to the one or more device contexts being detached from the peripheral device. In certain embodiments, the modules comprise one or more of hardware circuits, programmable hardware devices, and a processor executing code.

In one embodiment, an apparatus includes a reset request receiving module that receives the reset request for the peripheral device. The reset request may be received from a source that is external to the peripheral device or from a firmware associated with the peripheral device. In some embodiments, the disconnect module detaches each of the one or more device contexts by flagging each of the one or more device contexts as detached.

In various embodiments, each of the one or more device contexts transmits a detach event to its corresponding process in response to being detached from the peripheral device. In certain embodiments, the connection between the peripheral device and each process of the one or more device contexts comprises a direct memory access ("DMA") mapping between each process and one or more memory areas of the peripheral device or one or more memory areas allocated by the peripheral device.

In one embodiment, the access module sends an access violation event in response to a device context attempting to access the peripheral device mappings after the device context has been detached from the peripheral device. In some embodiments, the access module prevents the one or more device contexts for the one or more processes from accessing the peripheral device by preventing the one or more processes from sending device commands to existing device contexts and preventing the processes from creating new device contexts.

In one embodiment, the access module prevents the one or more device contexts for the one or more processes from accessing the peripheral device by preventing the one or more processes from accessing a mapped memory area of the peripheral device. In certain embodiments, the access module prevents the one or more device contexts for the one or more processes from accessing the peripheral device by preventing the one or more processes from accessing one or more command queues for the peripheral device. In some embodiments, the access module prevents the one or more device contexts for the one or more processes from accessing the peripheral device by disabling interrupts for the peripheral device.

In various embodiments, the apparatus includes a restart module that recreates one or more device contexts for one or more processes in response to the hardware device restarting. In one embodiment, the restart module is further configured to discard stale device contexts that the restart module does not recreate. In some embodiments, the restart module is further configured to send a re-attach event that notifies the one or more processes that the peripheral device is restarted. In certain embodiments, the peripheral device comprises a peripheral component interconnect express ("PCIe") hardware device.

A method, in one embodiment, includes detaching each of one or more device contexts from a peripheral device in response to a reset request for the peripheral device. Each of the one or more device contexts may describe a connection between the peripheral device and a process. In certain embodiments, the method includes preventing the one or more device contexts for one or more processes from accessing the peripheral device. In one embodiment, the method includes resetting the peripheral device in response to the request to detach one or more device contexts being detached from the peripheral device.

In one embodiment, the method includes receiving the reset request for the peripheral device. The reset request may be received from a source external to the peripheral device or from a firmware associated with the peripheral device. In some embodiments, detaching each of the one or more device contexts includes flagging each of the one or more device contexts as detached. In certain embodiments, each of the one or more device contexts transmits a detach event to its corresponding process in response to being detached from the peripheral device. In one embodiment, the connection between the peripheral device and each process of the one or more device contexts comprises a direct memory access ("DMA") mapping between each process and one or more memory areas of the peripheral device or allocated by the peripheral device.

In one embodiment, a computer program product includes a computer readable storage medium that has program instructions embodied therewith. In certain embodiments, the program instructions are executable by a processor to cause the processor to detach, by processor, each of one or more device contexts from a peripheral device in response to a reset request for the peripheral device, each of the one or more device contexts describing a connection between the peripheral device and a process. In some embodiments, the program instructions are executable by a processor to cause the processor to prevent, by processor, the one or more device contexts for one or more processes from accessing the peripheral device. In further embodiments, the program instructions are executable by a processor to cause the processor to reset, by processor, the peripheral device in response to the one or more device contexts being detached from the peripheral device. In some embodiments, the program instructions are further executable by the processor to cause the processor to receive, by processor, the reset request for the peripheral device. The reset request may be received from one of a source external to the peripheral device and a firmware associated with the peripheral device.

FIG. 1 depicts one embodiment of a system 100 for resetting a peripheral device. In one embodiment, the system 100 includes one or more information handling devices 102. The information handling devices 102 may include computing devices such as one or more of a desktop computer, a laptop computer, a server (e.g., a blade server, a rack server, a mainframe, a tower server, or the like), a tablet computer, a smart phone, a smart speaker (e.g., Amazon Echo®, Google Home®, Apple HomePod®), a security system, a set-top box, a gaming console, a smart TV, a smart watch, a fitness band or other wearable activity tracking device, an optical head-mounted display (e.g., a virtual reality headset, an augmented reality headset, smart glasses, or the like), a High-Definition Multimedia Interface ("HDMI") or other electronic display dongle, a personal digital assistant, a digital camera, a video camera, or another computing device comprising a processor (e.g., a central processing unit ("CPU"), a processor core, a field programmable gate array ("FPGA") or other programmable logic, an application specific integrated circuit ("ASIC"), a controller, a microcontroller, and/or another semiconductor integrated circuit device), a volatile memory, and/or a non-volatile storage medium.

In certain embodiments, the information handling devices 102 include one or more processors 103 (e.g., a central processing unit ("CPU")), processing units, processing cores, virtual processors, and/or the like. In further embodiments, the information handling devices 102 include volatile memory 104 such as random access memory ("RAM"), non-volatile storage memory such as a solid state drive, a hard drive, and/or the like. In certain embodiments, the volatile memory 104 may be used as mapped memory for direct memory access ("DMA"), or the like.

In some embodiments, the information handling device 102 includes an operating system 105 such as Microsoft Windows®, Mac OSX®, Linux®, or the like. The operating system 105 may include a virtual machine or another type of virtualized operating system 105. In various embodiments, the operating system 105 includes kernel space 106, which may be a reserved or dedicated area of memory 104 that is used for executing a privileged operating system kernel, kernel extensions, and most device drivers. In further embodiments, the operating system includes a user space 108, which may be a reserved or dedicated area of memory 104 for executing application software 109, user processes, and some drivers.

In some embodiments, the information handling device 102 includes one or more peripheral devices 110a-n, hardware devices, hardware interfaces, or the like that provide direct memory access ("DMA") capabilities. The peripheral devices 110a-n, for example, may include peripheral component interconnect ("PCI") memory mapped devices, PCI express ("PCIe") memory mapped devices, accelerated graphics port ("AGP") devices, and/or the like such as network devices (e.g., wired or wireless network cards), fast interconnects (InfiniBand® or Ethernet®), IO adapters (e.g., Fiber Channel) storage devices (e.g., solid state storage NVME devices), encryption or compression accelerators, graphics devices (e.g., video cards), and/or the like. In certain embodiments, the peripheral devices 110a-n include expansion cards, expansion boards, adapter cards, or accessory cards that comprise a printed circuit board that can be inserted into an electrical connector, or expansion slot, on a computer motherboard, backplane or riser card to add functionality to an information handling device via an expansion bus.

In certain embodiments, the peripheral devices 110a-n may include memory 112a-n on board the devices 110a-n such as registers or other fast, volatile memory. The registers may be used for a "configuration space". Configuration space registers can be mapped to memory locations. Device drivers and diagnostic software may access the configuration spaces, and operating systems 105 may have application programming interfaces ("APIs") to allow access to a device's configuration space. In certain embodiments, the memory 112a-n on the peripheral devices 110a-n may be private memory available as addressable memory regions. A PCIe device, for instance, may have one or several memory regions. Device drivers and diagnostic software can access these regions to "drive" the device 110a-n to implement hardware dependent tasks, while operating systems 105 provide APIs to allow access to these regions. These regions can also be mapped to applications for direct access.

As described above, an information handling device 102 may include an operating system that segregates virtual memory into kernel space 106 and user space 108. Primarily, this separation may serve to provide memory protection and hardware protection from malicious or errant software behavior. As an alternative to a traditional input/output ("I/O") driver model, where all direct peripheral device accesses are done by device drivers running in kernel space 106, operating systems 105 provide a user-space application with means to directly map the peripheral device memory accessible to the kernel to a user space address range. In the context of device drivers, this can provide user space applications 109 with direct access to the device memory 112a-n, which includes register configuration and I/O descriptors. All accesses by the application 109 to the assigned address range ends up directly accessing the device memory 112a-n. This allows implementation of most common IO operations in user space 108, without a need to perform a context switch to the operating system kernel for each I/O.

An example of such an approach is the "VERBS" API for user-space applications 109 that allows communication with remote direct memory access ("RDMA") capable devices like InfiniBand® or high speed Ethernet. As used herein, InfiniBand® may refer to a computer-networking communications standard used in high-performance computing that features very high throughput and very low latency. InfiniBand® may be used for data interconnect both among and within computers. The "VERBS" API, as used herein, may refer to the interface to the InfiniBand® device, which includes a set of verbs that are abstract representations of functions or methods that must exist in order to use the InfiniBand® device. The implementation of the "VERBS" functions is left to vendors.

Implementations of the "VERBS" API exists for Windows, Linux, and Unix operating systems 105. The kernel "VERBS" API provides device independent APIs that map virtual and PCI memory 112a-n to user space 108, and standard APIs to access RDMA capable hardware that kernel device drivers implement as device dependent plugins. Applications 109 may fall to the kernel for initialization tasks like opening device contexts, object creation, and mapping virtual and PCI memory 112a-n, and rely on user-space drivers for common I/O tasks. The user-space "VERBS" API provides device independent API to access RDMA devices and exchange data between them. Device dependent implementations of the "VERBS" API are user-space drivers that are provided as device-dependent plugins that implement standard "verbs" APIs and operate on device contexts in virtual and/or PCI memory 112a-n that are mapped to the user space 108 using kernel "VERBS" API.

Peripheral device kernel drivers that allow mapping the peripheral device's memory 112a-n to user-space applications 109 may need to track device contexts. As used herein, a device context may include a set of hardware and software resources allocated for a given process/application 109. The device driver (e.g., a "VERBS" device 110a-n) may manage the device context for a process/application 109 on behalf of the process/application 109. The driver may maintain a separate device context for each process/application 109 that accesses the device 110a-n. Peripheral devices 110a-n that support the "VERBS" API (like InfiniBand® or fast Ethernet) provide a good example of device context management. The "VERBS" API, for instance, enables user processes/applications 109 to directly manipulate the control registers of the peripheral device 110a-n through memory-mapped access.

Because these processes/applications 109 do not use traditional system calls for IO operations, a process/application 109 that accesses the peripheral device 110a-n need not call the device driver. However, the device driver may be called when a process/application initializes the peripheral device 110a-n. A kernel device driver may be called to open the device 110a-n, to map memory to a user-space application 109, and/or to create various objects that have hardware contexts like queue pairs ("QPs"), completion queues ("CQs"), memory regions ("MRs"), shared receive queues ("SRQs"), and/or the like. These objects may belong to a given device context, and use virtual, register, and PCI memory 112a-n that is mapped to a single process/application 109. In this way, memory protection and device context protection can be achieved between processes/applications 109 that open different device contexts. When these objects are created or destroyed, the "VERBS" driver in the kernel 106 selects the correct device context and provides any necessary synchronization when accessing the peripheral device 110a-n.

In one embodiment, to resolve this problem, the device context management interfaces enable a device driver to be called when a user process/application 109 opens and closes a device context or creates and destroys objects in a given context. The responsibility of the device driver may then be to control accesses to the peripheral device's hardware and to track and manage device contexts and objects within them.

Multiple user processes/applications 109 may have memory-mapped a peripheral device 110a-n. The peripheral device driver may allocate a set of PCI registers, virtual and/or PCI memory 112a-n and grant a first process/application 109 access to the peripheral device 110a-n via a set of memory mappings. The peripheral device driver may save the device context for the first process/application 109. The first process/application 109 may no longer need to fall to a kernel driver to perform I/O tasks. When, later, a second process/application 109 asks for access to the peripheral device 110a-n, the kernel device driver is called and a new set of PCI registers, virtual and PCI memory 112a-n is allocated and mapped to the second process/application 109.

The driver may then save the device context for the second process/application 109. The first process/application 109 may not access the device context of the second process/application 109 and vice versa. For example, for peripheral devices 110a-n that support the "VERBS" API, the first process/application 109 may not access connections of the second process/application 109.

In certain embodiments, when a first or second process/application 109 wishes to close its device context, or some objects within the device context, the device driver selects the correct device context and operates on objects within the selected device context. For example, an application 109 using the "VERBS" API may wish to destroy a subset of its connections to a peripheral device 110a-n, in which case a subset of objects in a device context may be destroyed, or it may perform a full cleanup when exiting, in which case all objects within the device context are destroyed and device mappings are unmapped.

In certain embodiments, a file object interface is used for multi-context device drivers for a peripheral device 110a-n. In some embodiments, when a device context is opened for a process/application 109, a file object is created by a kernel device driver. The interfaces for opening, closing, and memory mapping the file object may be provided by the device driver. Separation of device contexts may be achieved by using different file objects for different device contexts. When a process/application 109 calls a device driver, the file object (e.g., the file descriptor) for the device context is provided. Calls to the device driver may be implemented as file access methods such as open, close, poll, read, write, memory map, I/O control (e.g., special methods that allow commands to the peripheral device 110a-n that do not fit read or write implementation), and/or as other methods on the file object.

The device driver may track the file objects and may keep a reference count associated with each file object. When a device context is opened or mapped, for instance, the device driver increments (increases) the reference count. When a context is closed or unmapped, the device driver decrements (decreases) the reference count. When the reference count reaches zero, the device context, and all objects that belong to it, may be destroyed. In this manner, automatic cleanup can be performed without an explicit call to each object's destroy function when the process/application 109 is closed, terminated, or exits normally. Because all files are closed and all mappings are unmapped by the operating system 105, the device contexts created by the process/application 109 can be destroyed.

In certain embodiments, each process/application 109 may open multiple device contexts. For example, high-speed PCIe devices may have multiple hardware queues and interrupts such that multiple application threads and multiple device contexts may be needed to get to maximum performance. Typical applications may open 100 or more threads with each thread having a separate device context. Furthermore, each thread may be tied to a given CPU and may use a dedicated hardware queue and interrupt line that is tied to the same CPU for maximum performance.

In an embodiment that uses multiple device contexts, multiple processes/applications 109, and multiple computer nodes or information handling devices 102, a solution may be required to implement a fast shutdown, reset, and/or restart of a peripheral device driver on one or more nodes. This may be necessary to perform various tasks such as fencing a failed node (shutting down PCIe driver), restarting PCIe driver on one or more nodes due to a software update, restarting PCIe driver on a node because the PCIe device has encountered a firmware fault and it needs to reset, or the like.

Since all information handling devices 102/nodes may participate in modifying memory contents on another information handling device 102/node, other information handling devices 102/nodes may need to know when remote accesses are completed or aborted. Thus, all these tasks need to perform quickly to minimize interrupted service time for the product, because they involve remote memory, hardware resources, and remote CPU synchronization. Stopping the device driver for a peripheral device 110a-n may require destroying all open device contexts (and objects within them) and any additional resources created or allocated by the device driver for its operation.

Conventional solutions may stop applications before shutting down the device driver, then reload the device driver, and restart the applications 109. Conventional solutions are limited by slow restart of applications 109 due to the shut down and initialization tasks for each process/application 109. For example, allocating and freeing hundreds of gigabytes of RAM may take tens of seconds. Additional time will be taken by peripheral device commands that are used to create and destroy device contexts and objects within them. Other limitations may be that the conventional solutions cannot utilize command parallelism of the peripheral device 110a-n because the operating system 105 may close file objects one by one when a process/application 109 exits or terminates. Even if command parallelism can be achieved, the process/application 109 can still take a significant amount of time to start and exit due to the number of objects that the device driver creates and that need to be destroyed, which is depending on the current load of the peripheral device 110a-n. Furthermore, the peripheral device driver may take significant time to stop even if no device context is open because of additional resources it has created or allocated for its operation such as event queues, interrupts, cached objects, or the like.

The device apparatus 114, in one embodiment improves upon the conventional solutions by providing a device context aware peripheral device driver that supports forced quick detaching from all running applications. In some embodiments, the device apparatus 114, upon receiving a detach command, identifies a plurality of present device context entries from a list of open device contexts maintained by the device context device driver. Each present device context may be marked as detached. In some embodiments, the device apparatus 114 notifies applications about detach events via their device contexts. The device apparatus 114, in some embodiments, further invalidates the mapped memory areas associated with the plurality of present device context entries. The device apparatus 114, in certain embodiments, flushes the command queue of the peripheral device 110a-n and prevents new commands. The device apparatus 114, in further embodiments, disables open interrupts and DMA bus mastering and performs a quick reset of the peripheral device 110a-n. In one embodiment, if a driver restart is required, the device apparatus 114 reinitializes the driver state and recreates the necessary hardware objects to allow further normal operation. Following the completion of the reset, the device apparatus 114 may notify applications that the driver has restarted.

The device apparatus 114, in addition to tracking device contexts and objects within them, implements, manages, or maintains one or more command queues (request queues) and several event queues (response queues) for a device driver that supports multiple DMA transfers within multiple device contexts. Each such queue may include a kernel memory area that the device driver has allocated and a hardware representation of the queue within the device firmware or circuit. The device driver may create and destroy queues using commands that are specific to a peripheral device 110*a-n*. Each such queue may be paired with a control register (e.g., from a memory 112*a-n* of the peripheral device 110*a-n*), also known as a doorbell.

The memory 112*a-n*, for instance, associated with each queue may be a circular buffer that has several entries, typically of a fixed size. Each queue may have a producer index for the queue and consumer index for the queue. The producer index may be maintained internally by the writer of the queue (to know which entry to insert to the queue next). The producer index may be communicated by means of the doorbell register write to the consumer of the queue. The consumer index of the queue may be maintained internally by the consumer (e.g., the reader) of the queue to know what the last processed entry of the queue was. Thus, upon receiving notification of available events, the consumer may restart processing from the last consumer index. The consumer may also use the doorbell register of the queue to notify the producer of the last processed entry to avoid notification races between the producer and the consumer.

The command (request) queue may be used by the device apparatus 114 and/or the driver to insert commands (requests) to the peripheral device 110*a-n*. After a command is inserted, the associated doorbell register may be written to wake the peripheral device 110*a-n*, which will consume the command. Some request queues may be implemented by user space applications 109 with means of memory-mapped areas provided by the driver. For example, in a fast I/O path (e.g., posting send or receive requests) scenario, only one application 109 may have access to the queue such that driver assistance for synchronizing access to the queue is not needed. The command (request) queues that are maintained by the driver may be used for creation and deletion of device context objects and for other device objects created and maintained by the driver (e.g., implementation of cached objects or direct implementation of objects by kernel applications). The driver may provide the necessary synchronization for multiple applications 109 that access such command queues.

Event (response) queues may be used by the device apparatus 114 and/or the driver to receive notifications from the hardware about asynchronous peripheral device events, command completions, and/or I/O completions. Some event queues may be implemented by user space applications 109 with means of memory-mapped areas. For example, in a fast I/O path (e.g., posting send or receive requests) scenario, only one application 109 will have access to the queue such that driver assistance for synchronizing access is not needed. The event queues that the driver maintains may be used to process command responses and asynchronous events. The driver may provide the necessary synchronization for all applications 109 that access these event queues.

In further embodiments, the peripheral device driver may configure several interrupts such as MSI-X interrupts that are used to signal new events in event queues. Each interrupt may signal message delivery to one or more event queues. Even when some event queues are created and used by applications 109, they may still use interrupts as a means of receiving a notification that new events are available. This may be done to avoid excessive polling associated with processing events without interrupts.

The device apparatus 114 disclosed herein, in one embodiment, uses a firmware reset for a peripheral device 110*a-n* as means to quickly destroy created hardware contexts and stop DMA transfers to local and remote memory. There are multiple ways to perform a PCIE firmware reset, some of which may include a hot reset (from the root port of the device); a function level reset ("FLR") that is supported by the peripheral device 110*a-n* and allowed by the system firmware (this may require functional firmware on the peripheral device 110*a-n*, i.e., it cannot be used on crashed peripheral device 110*a-n*); firmware reset with a vendor command to the peripheral device 110*a-n*; peripheral device reset from the root port using a vendor command; and/or the like. In certain embodiments, even the slowest firmware reset methods complete within one second, and the typical time, depending on the peripheral device 110*a-n*, can be less.

In one embodiment, use of a firmware reset can be significantly faster than using firmware commands to destroy objects that the device driver has created and does not depend on the running firmware health or the peripheral device 110*a-n* load. It may also allow the firmware on the device to be updated—new firmware may be flashed and then the peripheral device 110*a-n* can be reset to activate the new firmware. However, executing a firmware reset while the device driver is running, while there are open interrupts, and/or while applications 109 have access to the peripheral device 110*a-n* may cause problems if not handled properly. In certain embodiments, a firmware reset is an asynchronous process; during a reset memory transfers from the driver to the peripheral device 110*a-n* or from the peripheral device 110*a-n* to the driver may not be allowed. Similarly, the peripheral device 110-*a-n* may not be allowed to emit interrupts during the firmware reset. Furthermore, applications may not be allowed to present new commands (e.g., commands to create, modify, or delete objects), and may be notified of the peripheral device reset to discard stale device contexts and objects and create new ones.

The data network 116, in one embodiment, includes a digital communication network that transmits digital communications. The data network 116 may include a wireless network, such as a wireless cellular network, a local wireless network, such as a Wi-Fi network, a Bluetooth® network, a near-field communication ("NFC") network, an ad hoc network, and/or the like. The data network 116 may include a wide area network ("WAN"), a storage area network ("SAN"), a local area network ("LAN"), an optical fiber network, the internet, or other digital communication network. The data network 116 may include two or more networks. The data network 116 may include one or more servers, routers, switches, and/or other networking equipment. The data network 116 may also include one or more computer readable storage media, such as a hard disk drive, an optical drive, non-volatile memory, RAM, or the like.

The wireless connection may be a mobile telephone network. The wireless connection may also employ a Wi-Fi network based on any one of the Institute of Electrical and Electronics Engineers ("IEEE") 802.11 standards. Alternatively, the wireless connection may be a Bluetooth® connection. In addition, the wireless connection may employ a Radio Frequency Identification ("RFID") communication including RFID standards established by the International Organization for Standardization ("ISO"), the International Electrotechnical Commission ("IEC"), the American Society for Testing and Materials® (ASTM®), the DASH7TM Alliance, and EPCGlobal™.

Alternatively, the wireless connection may employ a ZigBee® connection based on the IEEE 802 standard. In one embodiment, the wireless connection employs a Z-Wave® connection as designed by Sigma Designs®. Alternatively, the wireless connection may employ an ANT® and/or ANT+® connection as defined by Dynastream® Innovations Inc. of Cochrane, Canada.

The wireless connection may be an infrared connection including connections conforming at least to the Infrared Physical Layer Specification ("IrPHY") as defined by the Infrared Data Association® ("IrDA"®). Alternatively, the wireless connection may be a cellular telephone network communication. All standards and/or connection types include the latest version and revision of the standard and/or connection type as of the filing date of this application.

In some embodiments, one or more remote information handling devices 118 may remotely access a peripheral device 110a-n of a different information handling device 102 over the data network 116. In certain embodiments, the remote information handling devices 118 may be substantially similar to the information handling device 102 that is being remotely accessed. Furthermore, each remote information handling device 118 may include an instance of a device apparatus 114. In such an embodiment, one or more processes/applications 109 running on the remote information handling devices 118 may remotely access the peripheral devices 110a-n, or more specifically, the memory 112a-n of the peripheral devices 110a-n over the data network. For example, the peripheral devices 110a-n may allow remote DMA such that processes/applications running on the remote information handling devices 118 can remotely access the peripheral devices' memory 112a-n without involving the operating system of the remote information handling device 118 and/or the operating system 105 of the information handling device 102 that is being accessed remotely. Accordingly, the device apparatus 114 may manage and maintain device contexts for the remote processes/applications 109 that are accessing the peripheral devices 110a-n.

Figure 2:
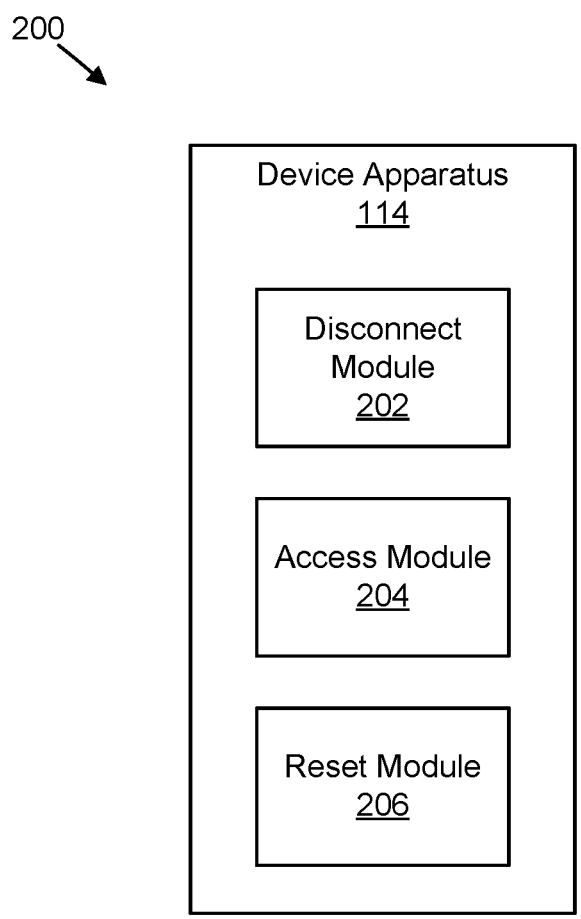
FIG. 2 is a schematic block diagram illustrating one embodiment of an apparatus for resetting a peripheral device.

FIG. 2 depicts one embodiment of an apparatus 200 for resetting a peripheral device. In one embodiment, the apparatus 200 includes an instance of a device apparatus 114. The device apparatus 114 may include one or more of a disconnect module 202, an access module 204, and/or a reset module 206, which are described in more detail below.

The disconnect module 202, in one embodiment, is configured to detach each of one or more device contexts from a peripheral device 110a-n in response to a reset request. As discussed above, a reset request may come from a peripheral device firmware event and/or may be external to the peripheral device110a-n (e.g., a reset button press on the peripheral device 110a-n, a reset pin or circuit that is an interface to the peripheral device 110a-n that is triggered externally (from a device driver, from a remote information handling device 118, from a process/application 109, and/or the like), and/or the like). Prior to resetting the peripheral device 110a-n, however, the disconnect module 202 detaches each of the device contexts for processes/applications 109 that are accessing the peripheral device 110a-n, e.g., for I/O events.

For instance, in one embodiment, the disconnect module 202 may detach each of the one or more device contexts by flagging each of the one or more device contexts as detached. In such an embodiment, the peripheral device 110a-n, or the peripheral device driver, may maintain a list, table, database, or other data structure of open device contexts, active device contexts, and/or the like for processes/applications 109 that are accessing the peripheral device 110a-n. The list may include a flag, value, bit, marker, or the like that indicates whether the device context is open, closed, active, inactive, attached, detached, or the like. The disconnect module 202, in response to the received reset request may set the value of the flag to indicate that the device context is detached. In certain embodiments, the disconnect module 202 iterates over the list, table, database, or the like to identify the open device contexts for the peripheral device 110a-n and flag each device context as detached. In certain embodiments, the list may be stored in non-volatile storage such that it can be accessed when the peripheral device 110a-n restarts, as described below with reference to the restart module 304 illustrated in FIG. 3.

In some embodiments, the disconnect module 202 creates, generates, sends, transmits, and/or the like a signal, message, code, alert, event, or the like that indicates a connection error, a detach event, or the like in response to a device context, e.g., a process/application 109 attempting to access the peripheral device 110a-n after it has been flagged as detached. In certain embodiments, the device context for a process/application 109 transmits the detach event to its corresponding process/application 109. Accordingly, as explained in more detail below, the corresponding processes/applications 109 may register to receive the error message so that it can be handled, e.g., if the processes/application 109 wish to support fast driver restart. In some embodiments, the detach event may be enqueued to a queue, buffer, or the like so that a process/application 109, or a device context for a process/application 109, can access, read, or the like the detach event.

In certain embodiments, the access module 204 is configured to prevent the one or more device contexts for one or more processes from accessing the peripheral device 110a-n. In some embodiments, the access module 204 prevents the one or more device contexts for the one or more processes/application 109 from accessing the peripheral device 110a-n by preventing the one or more processes/applications 109 from accessing a driver for the peripheral device 110a-n. For instance, the access module 204 may detect calls to functions, libraries, instructions, and/or other commands from an application/process 109 that are intended for the device driver for a peripheral device 110a-n, and may intercept the calls to functions, libraries, instructions, and/or other commands and discard, ignore, or the like the calls to functions, libraries, instructions, and/or other commands. In other words, the access module 204 fences the device contexts for processes/applications 109 from accessing the device driver for a peripheral device 110 in response to the reset request, e.g., prevents the device driver from receiving data transmissions, communications, or the like from the processes/applications 109.

In one embodiment, the access module 204 prevents the one or more device contexts for the one or more processes/applications 109 from accessing the peripheral device 110a-n by preventing the one or more processes/applications 109 from accessing a mapped memory area 112a-n of the peripheral device 110a-n. For instance, if a device context is utilizing DMA for the memory areas 112a-n of the peripheral device 110a-n, the access module 204 may unmap the memory areas from the device context, and thus prevent any read/write commands to the memory area 112a-n that is used for the DMA access by the fenced device context to the peripheral device 110a-n. In such an embodiment, the access module 204 may flush and/or process any pending or queued read and write requests in response to the reset request while discarding read/write requests that are received after the reset request is received.

In certain embodiments, the access module 204 prevents the one or more device contexts for the one or more processes/applications 109 from accessing the peripheral device 110a-n by preventing the one or more processes/ applications 109 from accessing one or more command queues for the peripheral device 110*a-n*. The command queues, as described above, may include memory read/write queues, event queues, I/O queues, and/or other queues that are used to buffer data transfers between the peripheral device 110*a-n* and the processes/applications 109 that have an open device context to the peripheral device. In certain embodiments, the access module 204 may intercept, receive, or detect incoming commands, requests, events, or the like after the reset request is received and may ignore or discard the incoming commands, requests, events, or the like so that they are not queued for processing by the peripheral device 110*a-n*. Furthermore, the access module 204 may process or flush pending commands in the queues that were queued or buffered prior to the reset request being received.

In one embodiment, the access module 204 prevents the one or more device contexts for the one or more processes/applications 109 from accessing the peripheral device 110*a-n* by disabling interrupts for the peripheral device 110*a-n*. For instance, the access module 204, in response to receiving the reset request, may prevent sending and/or receiving interrupts at the peripheral device 110*a-n* to/from the processes/applications 109. The interrupts may include I/O interrupts such as message signaled interrupts ("MSI"), MSI-X interrupts, and/or the like. Such interrupts may be utilized by writing interrupt-describing data to a memory-mapped I/O address, which is used to send and/or deliver the interrupt.

In one embodiment, the access module 204 may prevent each of the one or more device contexts from accessing the peripheral device 110*a-n* by closing a connection to the peripheral device 110*a-n*. For instance, the access module 204 may close a socket or other logical connection to the peripheral device 110*a-n*, to the memory 112*a-n* of the peripheral device 110*a-n*, to the device driver, and/or the like. The access module 204, in further embodiments, closes a connection to the peripheral device 110*a-n* at one or more ports of the peripheral device 110*a-n*, e.g., by preventing processes/applications 109 from accessing the peripheral device 110*a-n* at the connection ports for the peripheral device 110*a-n*.

In certain embodiments, the access module 204 sends an access violation event, message, notification, signal, or the like in response to a device context attempting to access the peripheral device 110*a-n* after the device context has been detached from the peripheral device 110*a-n*. The access module 204, for example, may post an access violation event for registered applications/processes 109 to read, may send an access violation event to registered applications/processes 109, and/or the like. In this manner, the processes/applications 109 can react, handle, or the like an access violation event. For example, in response to the access violation event, the applications/processes 109 can periodically poll or check the state of the peripheral device 110*a-n* and suspend pending accesses to the peripheral device 110*a-n* until a re-attach or reconnection event is received.

In one embodiment, the reset module 206 is configured to reset the peripheral device 110*a-n* in response to the one or more device contexts being detached from the peripheral device 110*a-n*. In certain embodiments, the reset may include a fundamental reset that resets the peripheral device 110*a-n* to a power-on state. In some embodiments, the reset may be a firmware reset, otherwise known as a hot reset. In such an embodiment, as discussed above, when a firmware reset is triggered, the configuration registers may be reset, e.g., in the case where the peripheral device 110*a-n* comprises a PCI device, but the peripheral device 110*a-n* is not completely reset to a power-on state.

In one example embodiment, the reset module 206 performs a firmware reset on a PCIe device by disabling DMA bus mastering on the device using the PCIe configuration space. The reset module 206 may disable the PCIe link on the PCIe port to which a device is connected. The reset module 206 may do this by setting a "disable" bit of the PCIe link control capability descriptor in the PCIe configuration space. The reset module 206 may then wait for the PCIe link of the connected port to go down, using the PCIe link status capability descriptor in the PCIe configuration space. The reset module 206 may determine that the PCIe link is down in response to the bits of the link status capability indicating a zero link width, no link training, and/or an inactive data link layer. Waiting may be done by repeated, periodic reads or polling of the PCIe link capability descriptor. In certain embodiments, determining that the PCIe link is down takes less than 50 microseconds.

Continuing with this example, the reset module 206 waits a period of time (e.g., usually 50 microseconds or less) to allow the PCIe device to start reloading the firmware. The reset module 206 may then enable the PCIe link on the PCIe port to which a device is connected by clearing the "disable" bit of the PCIe link control capability descriptor in the PCIe configuration space. Using the PCIe link status capability descriptor in the PCIe configuration space, the reset module 206 may wait for the PCIe link of the connected port to go up. The reset module 206 determines that the link is up when the bits of the link status capability indicate a non-zero link width, no link training, and/or the data link layer is active. The reset module 206 may wait by performing repeated, periodic reads or polls of the PCIe link capability descriptor. In certain embodiments determining that the PCIe link is up takes less than 100 microseconds.

The reset module 206 may wait a period of time to verify that the firmware for the PCIe device has completed reloading. In certain embodiments, the PCIe device completes reset in less than one second. The PCIe device may provide a PCIe configuration or memory interface (available when the PCIe link is up) that the reset module 206 can use to check that the PCIe device has completed firmware initialization. For instance, a firmware initialization bit may be set and cleared in the configuration space for the PCIe device or one of its memory areas.

In this manner, a peripheral device 110*a-n* can be shut down and restarted quickly using a firmware or hot reset while gracefully detaching from open device context connections to the peripheral device 110*a-n*.

Figure 3:
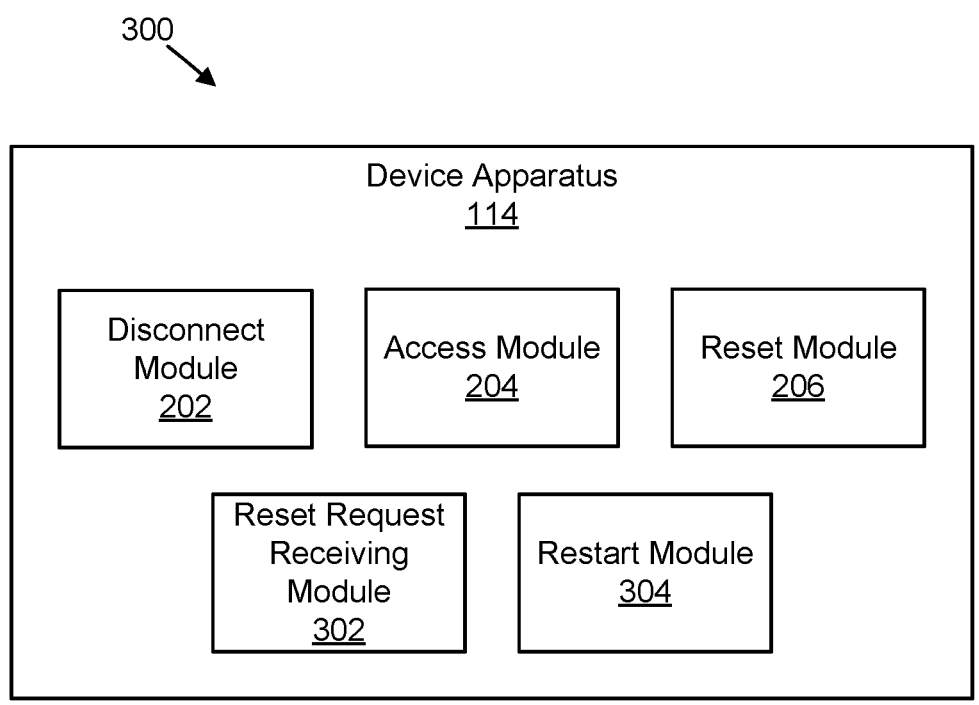
FIG. 3 is a schematic block diagram illustrating one embodiment of another apparatus for resetting a peripheral device.

FIG. 3 depicts one embodiment of an apparatus 300 for resetting a peripheral device. In one embodiment, the apparatus 300 includes an instance of a device apparatus 114. The device apparatus 114 may include one or more of a disconnect module 202, an access module 204, and/or a reset module 206, which may be substantially similar to the disconnect module 202, access module 204, and reset module 206 described above with reference to FIG. 2. In further embodiments, the device apparatus 114 includes one or more of a reset request receiving module 302 and a restart module 304, which are described in more detail below.

In one embodiment, the reset request receiving module 302 is configured to receive the reset request for the peripheral device 110. The request receiving module 302 may receive a firmware reset event or other type of reset request from a device driver, from an operating system 105, from an application, and/or the like, and may notify the disconnect module 202 that a reset request has been received so that the various steps described above can be taken to prepare the peripheral device 110*a-n* for a reset while notifying applications/processes 109 that have an open device context to the peripheral device 110*a-n*.

In one embodiment, the restart module 304 is configured to reinitialize the state of the device driver and/or the peripheral device 110*a-n* by running driver and/or hardware initialization routines, enabling access to DMA, recreating command and event queues, reconfiguring and enabling interrupts (e.g., MSI-X interrupts), and/or the like. In certain embodiments, the restart module 304 recreates one or more device contexts (and their corresponding objects). In certain embodiments, the restart module 304 checks the existing or stored list of device contexts that were open prior to the peripheral device 110*a-n* being reset and recreates the device contexts or relies on/instructs processes/applications 109 to recreate the objects. In such an embodiment, the restart module 304 sends a notification, message, signal, alert, or the like to the processes/applications to indicate that the peripheral device 110*a-n* has restarted.

In one embodiment, the restart module 304 sends a re-attach event to notify processes/applications 109 that the peripheral device 110*a-n* is in a state that the processes/applications 109 can re-attach to the peripheral device 110*a-n* for DMA access, sending data commands/requests, receiving interrupts, and/or the like. In certain embodiments, each device context enqueues and/or sends a re-attach event to its corresponding process/application 109. Accordingly, processes/applications 109 that want to support fast restart of the driver and/or peripheral device 110*a-n* need to be configured to handle the re-attach event. For instance, upon receiving the re-attach event, processes/applications 109 may reinitialize or recreate the device context objects so that they can access the peripheral device 110*a-n* again. In some embodiments, the restart module 304 discards stale device contexts to free the memory that is being used. Stale device contexts may include device context objects that did not re-attach to the peripheral device 110*a-n* when the peripheral device 110*a-n* restarted.

Figure 4:
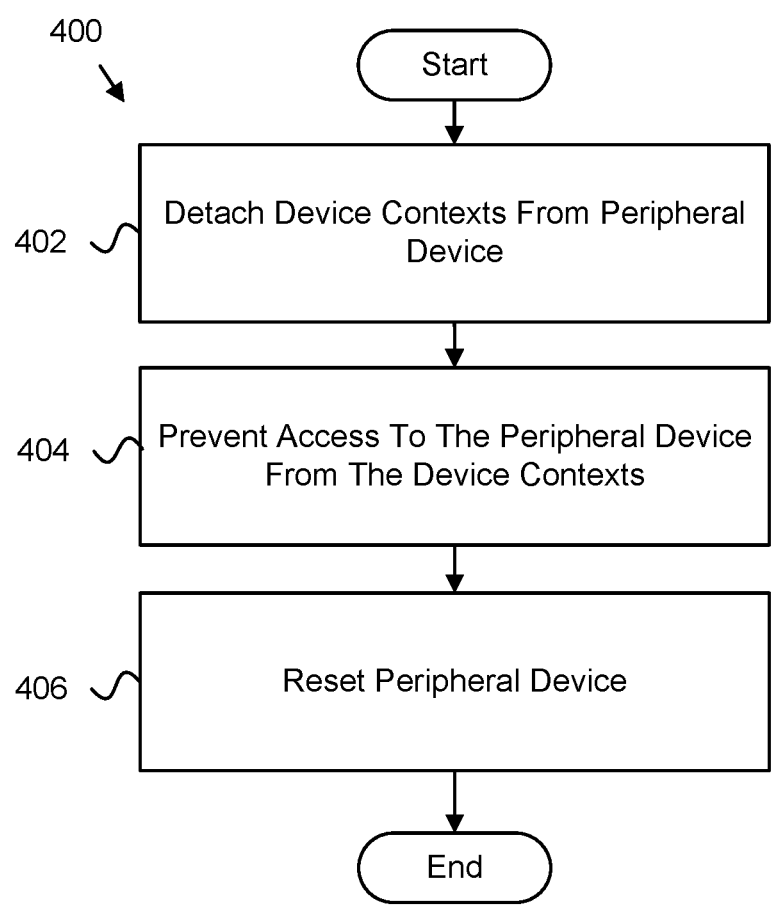
FIG. 4 is a schematic flow chart diagram illustrating one embodiment of a method for resetting a peripheral device.

FIG. 4 depicts one embodiment of a method 400 for resetting a peripheral device. In one embodiment, the method 400 begins and detaches 402 each of one or more device contexts from a peripheral device 110*a-n* in response to a reset request for the peripheral device 110*a-n*. Each of the one or more device contexts may describe a connection between the peripheral device 110*a-n* and a process/application 109.

In certain embodiments, the method 400 prevents 404 the one or more device contexts for one or more processes/applications 109 from accessing the peripheral device 110*a-n*. In further embodiments, the method 400 resets 406 the peripheral device 110*a-n* in response to the one or more device contexts being detached from the peripheral device 110*a-n*, and the method 400 ends. In certain embodiments, the disconnect module 202, the access module 204, and the reset module 206 perform the various steps of the method 400.

Figure 5:
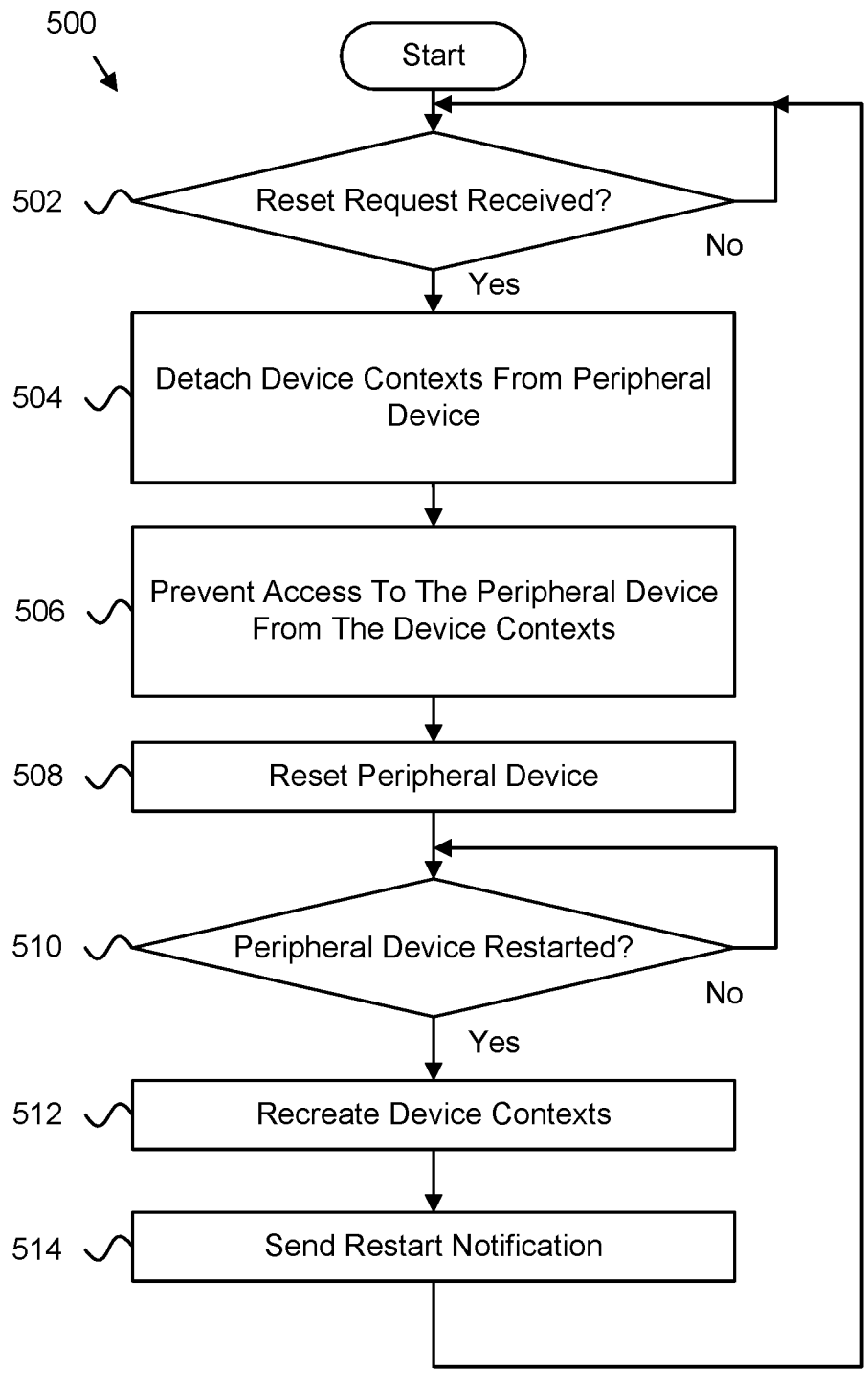
FIG. 5 is a schematic flow chart diagram illustrating one embodiment of a method for resetting a peripheral device.

FIG. 5 depicts one embodiment of a method 500 for resetting a peripheral device. In one embodiment, the method 500 begins and determines 502 whether a reset request has been received for a peripheral device 110*a-n*. If not, the method 500 continues to check for a reset request. Otherwise, the method 500 detaches 504 each of one or more device contexts from a peripheral device 110*a-n* in response to a reset request for the peripheral device 110*a-n*.

In certain embodiments, the method 500 prevents 506 the one or more device contexts for one or more processes/applications 109 from accessing the peripheral device 110*a-n*. In further embodiments, the method 500 resets 508 the peripheral device 110*a-n* in response to the one or more device contexts being detached from the peripheral device 110*a-n*.

In certain embodiments, the method 500 determines 510 whether the peripheral device 110*a-n* has restarted. If not, the method 500 continues to check if the peripheral device 110*a-n* has restarted. Otherwise, the method 500 recreates 512 one or more device contexts for processes/applications 109 that had device contexts for the peripheral device 110*a-n* prior to the peripheral device 110*a-n* being reset. The method 500, in some embodiments, sends 514 a restart and/or re-attach notification to the processes/applications 109 that want to reattach to the peripheral device 110*a-n*, and the method continues to check 502 for a reset request. In some embodiments, the disconnect module 202, the access module 204, the reset module 206, the reset request receiving module 302, and the restart module 304 perform the various steps of the method 500.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An apparatus comprising:
a disconnect module that detaches each of one or more device contexts from a peripheral device in response to a reset request for the peripheral device, each of the one or more device contexts describing a connection between the peripheral device and a process;
an access module that prevents the one or more device contexts for one or more processes from accessing the peripheral device; and
a reset module that resets the peripheral device in response to the one or more device contexts being detached from the peripheral device,
wherein said modules comprise one or more of hardware circuits, programmable hardware devices, and a processor executing code.

2. The apparatus of claim 1, further comprising a reset request receiving module that receives the reset request for the peripheral device, the reset request received from one of a source external to the device and a firmware associated with the peripheral device.

3. The apparatus of claim 1, wherein the disconnect module detaches each of the one or more device contexts by flagging each of the one or more device contexts as detached.

4. The apparatus of claim 1, wherein the each of the one or more device contexts transmits a detach event to its corresponding process in response to being detached from the peripheral device.

5. The apparatus of claim 1, wherein the connection between the peripheral device and each process of the one or more device contexts comprises a direct memory access ("DMA") mapping between each process and one or more memory areas of the peripheral device.

6. The apparatus of claim 1, wherein the access module sends an access violation event in response to a device context attempting to access the peripheral device after the device context has been detached from the peripheral device.

7. The apparatus of claim 1, wherein the access module prevents the one or more device contexts for the one or more processes from accessing the peripheral device by preventing the one or more processes from accessing a driver for the peripheral device.

8. The apparatus of claim 1, wherein the access module prevents the one or more device contexts for the one or more processes from accessing the peripheral device by preventing the one or more processes from accessing a mapped memory area of the peripheral device.

9. The apparatus of claim 1, wherein the access module prevents the one or more device contexts for the one or more processes from accessing the peripheral device by preventing the one or more processes from accessing one or more command queues for the peripheral device.

10. The apparatus of claim 1, wherein the access module prevents the one or more device contexts for the one or more processes from accessing the peripheral device by disabling interrupts for the peripheral device.

11. The apparatus of claim 1, further comprising a restart module that recreates one or more device contexts for one or more processes in response to the hardware device restarting.

12. The apparatus of claim 11, wherein the restart module is further configured to discard stale device contexts that the restart module does not recreate.

13. The apparatus of claim 11, wherein the restart module is further configured to send a re-attach event that notifies the one or more processes that the peripheral device has restarted.

14. A method comprising:
   detaching each of one or more device contexts from a peripheral device in response to a reset request for the peripheral device, each of the one or more device contexts describing a connection between the peripheral device and a process;
   preventing the one or more device contexts for one or more processes from accessing the peripheral device; and
   resetting the peripheral device in response to the one or more device contexts being detached from the peripheral device.

15. The method of claim 1, further comprising receiving the reset request for the peripheral device, the reset request received from one of a source external to the device and a firmware associated with the peripheral device.

16. The method of claim 15, wherein detaching each of the one or more device contexts includes flagging each of the one or more device contexts as detached.

17. The method of claim 15, wherein the each of the one or more device contexts transmits a detach event to its corresponding process in response to being detached from the peripheral device.

18. The method of claim 15, wherein the connection between the peripheral device and each process of the one or more device contexts comprises a direct memory access ("DMA") mapping between each process and one or more memory areas of the peripheral device.

19. A computer program product comprising a computer readable storage medium having program instructions embodied therewith, the program instructions executable by a processor to cause the processor to:
   detach, by processor, each of one or more device contexts from a peripheral device in response to a reset request for the peripheral device, each of the one or more device contexts describing a connection between the peripheral device and a process;
   prevent, by processor, the one or more device contexts for one or more processes from accessing the peripheral device; and
   reset, by processor, the peripheral device in response to the one or more device contexts being detached from the peripheral device.

20. The computer program product of claim 19, wherein the program instructions are further executable by the processor to cause the processor to receive, by processor, the reset request for the peripheral device, the reset request received from one of a source external to the peripheral device and a firmware associated with the peripheral device.

* * * * *